UNITED STATES PATENT OFFICE.

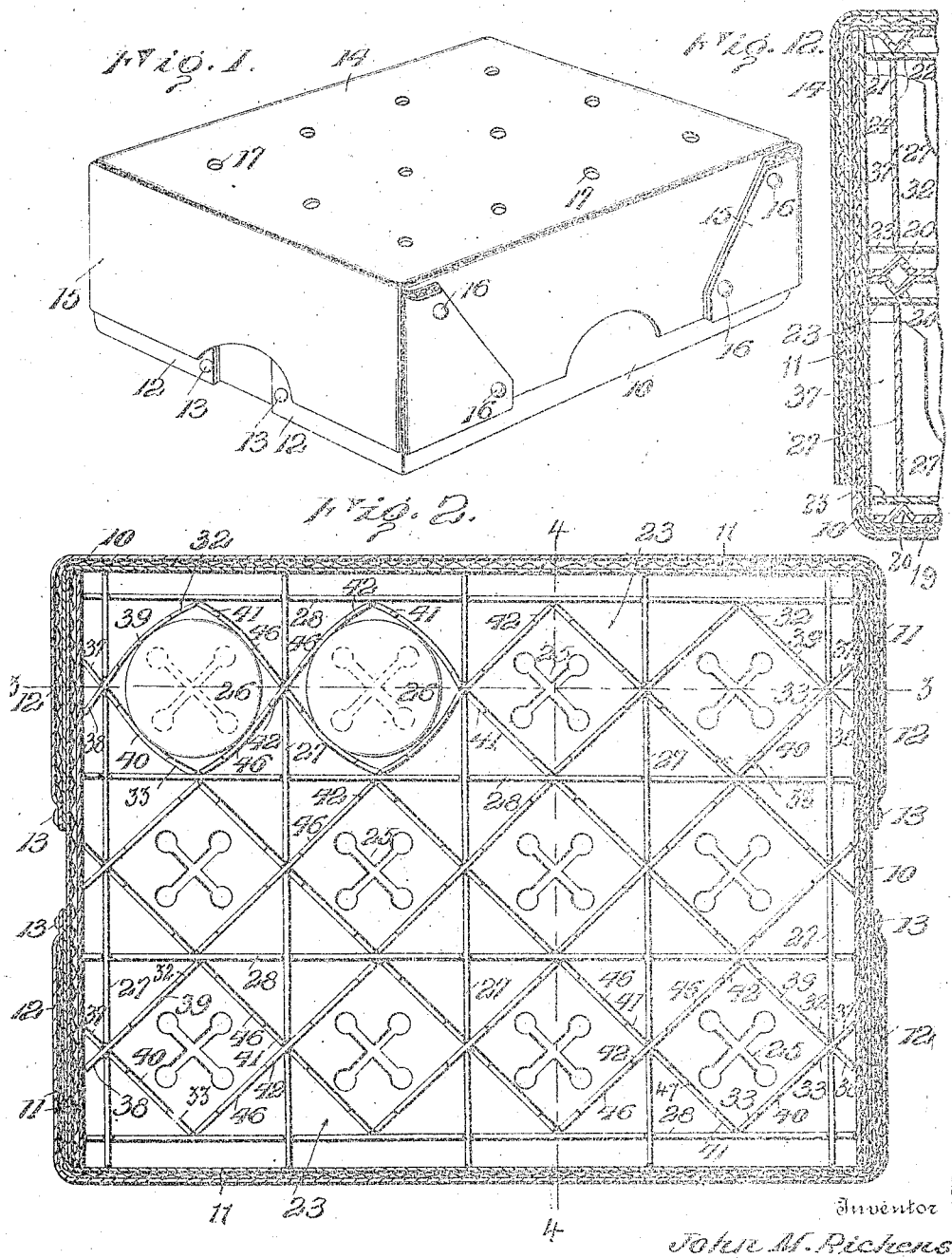

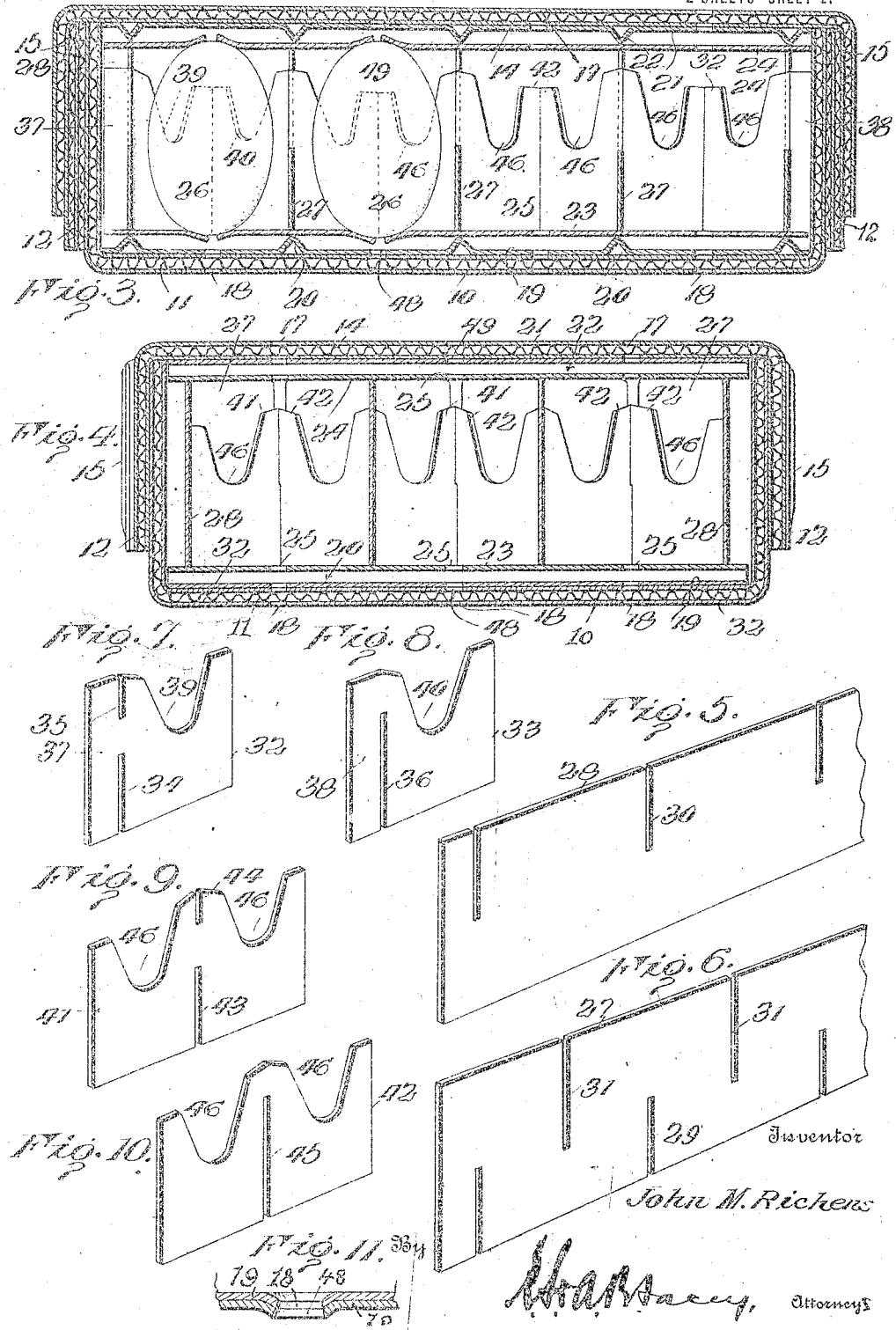

JOHN M. RICHENS, OF JACKSONVILLE, FLORIDA.

SHIPPING-RECEPTACLE.

1,216,165.  Specification of Letters Patent.  Patented Feb. 13, 1917.

Application filed December 31, 1915. Serial No. 69,641.

*To all whom it may concern:*

Be it known that I, JOHN M. RICHENS, a citizen of the United States, residing at Jacksonville, in the county of Duval and State of Florida, have invented certain new and useful Improvements in Shipping-Receptacles, of which the following is a specification.

This invention relates to receptacles adapted to transport fragile articles, such as eggs, fruit and the like, more particularly for shipping such articles or products in the mails under parcel post rules, and has for one of its objects to improve the construction and increase the efficiency of devices of this character.

Another object of the invention is to provide a device of this character whereby each article shipped is separately disposed and protected from pressure from the outside or from contact of one of the articles with the other, and in which the contents are readily accessible without destroying any of the parts of the device.

Another object of the invention is to provide a device of this character adapted more particularly for the shipment of eggs and in which provision is made for the ready removal of any individual egg without disturbing the remaining eggs.

With these and other objects in view, the invention consists in certain novel features of construction as hereinafter shown and described and then specifically pointed out in the claims; and in the drawings illustrative of the preferred embodiment of the invention—

Figure 1 is a perspective view of the improved device complete;

Fig. 2 is a plan view of the lower or body portion of the improved device;

Fig. 3 is a section on the line 3—3 of Fig. 2;

Fig. 4 is a section on the line 4—4 of Fig. 2;

Figs. 5 and 6 are perspective views of portions of the main division members of the improved device;

Figs. 7 and 8 are detached perspective views of the marginal egg retaining members;

Figs. 9 and 10 are detached perspective views of the intermediate egg retaining members;

Fig. 11 is a sectional detail illustrating the manner of forming the ventilating perforations;

Fig. 12 is a sectional detail illustrating the arrangement of the device for holding a plurality of layers of eggs or other products.

Corresponding and like parts are referred to in the following description and indicated in all the views of the drawings by the same reference characters.

The improved device includes a lower receptacle or body portion, a plurality of transverse division members, a plurality of egg retaining members supported by the division members, holding members for the ends of the eggs, and spacer members between the bottom and the division members and likewise between the top and the division members. The lower or body portion of the casing is represented as a whole at 10 and constructed preferably of paper, each wall being formed of two thicknesses of paper or card-board spaced apart and maintained in spaced relation by members preferably of paper bent into corrugated or flute-like form, as illustrated at 11. The bottom, sides and ends of the portion 10 of the device are preferably constructed from a single sheet of the material above described with the terminals of the sides overlapping the ends, as illustrated at 12, and secured by rivets or like fastening devices 13. By this means the major portions of the ends of the device are formed with two thicknesses of the material, thereby materially increasing the strength and the resisting power, as hereafter explained.

The top or cover of the casing, represented as a whole at 14, is likewise formed of the same material as the body and constructed from a single piece with the ends, indicated at 15, folded around the sides and secured by rivets or like fastening devices 16. The top 14 is likewise provided with a plurality of ventilating apertures 17, while the bottom of the casing is provided with similar apertures, indicated at 18. The sides of the top are preferably nearly as high as the sides of the casing, as indicated in Fig. 1, so that the casing is amply protected by the side walls of the top and the sides and ends of the receptacle practically increased in thickness by the side walls of the top.

Bearing upon the bottom of the body of the receptacle is a plate-like member, represented as a whole at 19 and provided with upwardly directed V-shaped ribs 20 preferably formed integral with the member 19. Bearing upon the inner face of the top 14 is a similar member 21 having V-shaped ribs 22. Each of the members 19 and 21 is preferably formed from a sheet of cardboard and the ribs 20 and 22 formed integral therewith by "scoring" the card-board and bending the ribs along the scores.

Another sheet 23 of yieldable material, preferably card-board, is located within the casing and in contact with the ribs 20, while a similar sheet 24 of yieldable material, preferably card-board, is located within the casing and in engagement with the ribs 22. Each of the sheets 23—24 is formed with a plurality of clefts preferably in X-shape, as shown at 25 in Fig. 2, to form a plurality of points which may be bent slightly outward by contact with the eggs or other articles, two of which are represented conventionally at 26, as hereafter more fully explained.

Located within the lower or body portion 10 of the receptacle are a plurality of division members 27—28, the division members 28 extending longitudinally of the receptacle while the division members 27 extend transversely of the receptacle. The members 27—28 are provided with gains or clefts 29—30 which interengage and support the members in position spaced at equal intervals and thus forming a plurality of pockets or recesses, as illustrated in Fig. 2. The members 27—28 correspond in width to the distance between the members 23—24 so that when the parts are assembled, as shown in Figs. 3 and 4, the closure 14 will compress all of the parts in close relation and prevent rattling or displacement. The outer members 27—28, it will be noted, are spaced some distance from the inner walls of the receptacle, thus providing a protecting space between the pockets and the walls of the casing. By this means the contents of the pockets are protected from concussion from surrounding objects. Each of the pockets is provided with egg protecting members or cushion devices formed as shown in Figs. 7, 8, 9 and 10. The members 27 are each provided with an intermediate upwardly opening gain or cleft 31 mid-way of each of the pockets to receive and support the cushion members for the eggs or other articles when deposited within the pockets. The cushion members for the outer sides of the terminal pockets are illustrated in Figs. 7 and 8 and each consists of sheets 32—33, the sheet 32 having a lower gain 34 to coact with the gains 31 of the terminal members 27 and likewise provided with a shorter gain or cleft 35 to coact with a longer gain 36 in the member 33. The longer gain 36 also coacts with the gain 31 of the terminal members 27 and thus holds the members 32—33 in the position shown in Fig. 2 with the outer portions 37—38 of the member 32—33 extending into the space between the members 27 and the end walls of the receptacle. Formed in the upper edge of each of the members 32 is a relatively large recess 39, while a similar recess 40 is formed in the upper edge of each of the members 33.

Other cushion members are arranged to coact with the intermediate members 27 and are formed as illustrated at 41—42 in Figs. 9 and 10. Each of the members 41 is provided with a downwardly opening gain or cleft 43 and a shorter upwardly opening cleft or gain 44, while each of the members 42 is provided with a relatively long downwardly opening gain 45. The members 41—42 are thus adapted to be interlocked and cross each other substantially at right angles with the gains 43—45 coacting with the gains 41 of the members 27 to support the cushion members 41—42 in the position shown in Fig. 2. The members 32—33 and 41—42 are normally straight, as represented in the major portion of Fig. 2, but when the egg or like article 26 is deposited within the pocket the cushion members will be bent slightly outward as illustrated at the upper left hand portion of Fig. 2, and thus produce a pressure against the egg to support it in position. The members 41—42 are each provided with recesses 46—47 similar to the recesses 39—40 of the members 32—33 and coacting therewith, as illustrated in Fig. 2, to expose the upper portion of the eggs, to enable them to be readily removed by the fingers without disturbing the cushion members. This is an important feature of applicant's device and adds materially to its value and efficiency and convenience of inserting and removing the eggs or other articles.

In assembling the parts of the device the guard member 23 is first located in position and then the united division members, together with the cushion members, assembled and deposited within the receptacle with the lower edges of the division members in contact or bearing upon the member 23. The eggs or other articles are then deposited in the pockets and forced downwardly to cause them to distort the cushion members, as illustrated in Fig. 2. The upper guard member 24 is then disposed in position over the upper edges of the division members and the cover applied, the downward pressure of the cover forcing the ribs 22 against the member 24 and crowding it slightly over the upper ends of the eggs and likewise crowding the lower ends of the eggs against the tongue-like portions of the member 23 and slightly curving them downwardly and likewise curving the tongue-like portions 34 upwardly as illustrated in Fig. 3 at the right. By this means a sufficient pressure is applied to the sides and the ends of the eggs to hold them from lateral displacement and likewise from injury from concussions if the receptacle comes in contact with surrounding objects.

All of the parts of the improved device are preferably constructed from card-board or the like, as before stated. For the purpose of illustration the device is shown adapted to support a dozen eggs, as shown in Fig. 2, but it will be understood, of course, that the receptacle may be constructed with any required number of the pockets.

The improved device is adapted more particularly to the shipment of eggs and like fragile articles by mail under the parcel post rule, but may be employed for shipment by express or otherwise.

The plates 19—21 are preferably secured to the bottom and top of the receptacle by cementing or otherwise, and perforated as shown at 48—49, the perforations of the plates registering with the perforations 17—18 of the top and bottom. In practice the perforations in the top and bottom and the plates are punched through the confronting members after they are united, with the edges of the material curved inwardly as illustrated in Fig. 11, and thus materially increasing the strength and stiffness of the parts. The ventilating perforations are located to communicate with each end of each compartment or pocket, as shown.

The improved device may be arranged to hold a plurality of layers of eggs or other products, as shown in Fig. 12.

Having thus described the invention, what is claimed as new is:—

1. In a shipping receptacle, division members formed into a plurality of pockets to receive the articles to be shipped and having clefts in their walls intermediate the pockets, and a plurality of cushion members disposed obliquely to the walls of the pockets having clefts coacting with the clefts of said division members and provided with upwardly opening recesses in their upper edges.

2. In a shipping receptacle, an inclosing casing including side walls and top and bottom members, a plurality of division members within the casing and formed into a plurality of pockets to receive the articles to be shipped, and a plurality of cushion members within the pockets disposed diagonally of the walls of the pockets and at opposite sides of the articles therein and each having an upwardly opening recess in its upper edge.

3. In a shipping receptacle, an inclosing casing including side walls and top and bottom members, a plurality of division members within the casing and formed into a plurality of pockets to receive the articles to be shipped, a plurality of cushion members within the pockets at opposite sides of the articles therein and each having an upwardly opening recess in the upper edge, and a plurality of guard members of yieldable material having intersecting clefts and bearing against the ends of the articles within the pockets.

4. In a shipping receptacle, division members formed into a plurality of pockets to receive the articles to be shipped and having clefts in their walls intermediate the pockets, and a plurality of cushion members disposed obliquely to the walls of the pockets and having clefts coacting with the said division members, the inner terminals of the cushion-members engaging the inner faces of the division members.

5. In a shipping receptacle, an inclosing casing including side walls and top and bottom members, plates bearing respectively against the inner faces of said top and bottom members, said top and bottom members having ventilating perforations formed therethrough and the edges of the perforations bent inwardly to lock the members together, spacing ribs carried by said plates, guard members of yieldable material bearing respectively upon said ribs, and a plurality of division members within the casing and formed into a plurality of pockets to receive the articles to be shipped and bearing between the guard members.

In testimony whereof, I affix my signature.

JOHN M. RICHENS. [L. S.]